Dec. 31, 1957 C. B. DALE 2,818,263
PHONOGRAPH
Filed Feb. 27, 1951 5 Sheets-Sheet 1

INVENTOR.
Colin B. Dale
BY
Benning & Benning
Attys.

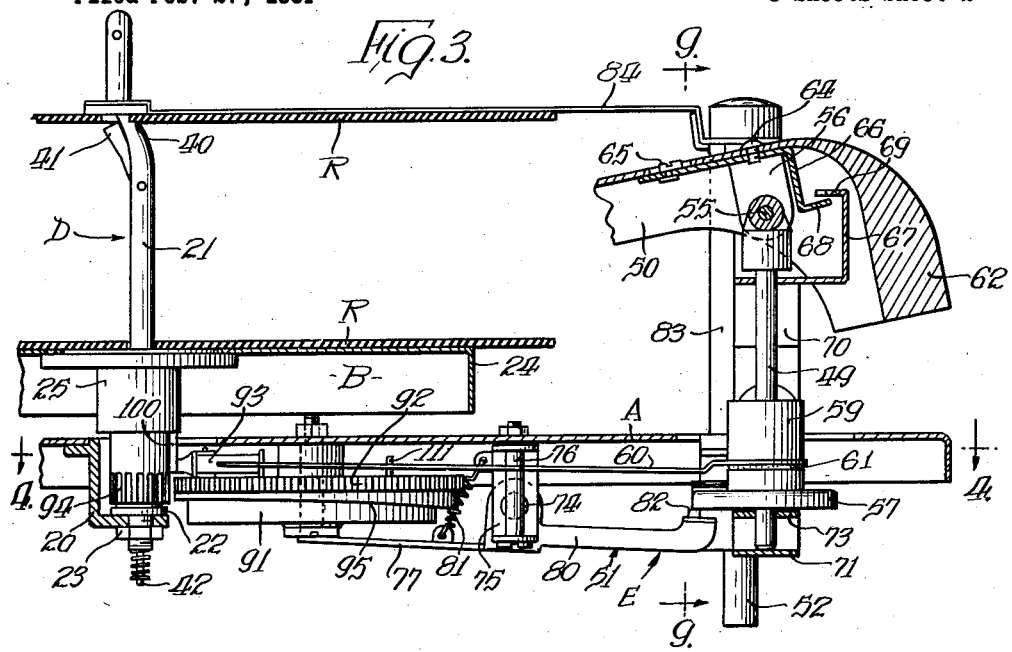

Dec. 31, 1957 C. B. DALE 2,818,263
PHONOGRAPH
Filed Feb. 27, 1951 5 Sheets-Sheet 3

INVENTOR.
Colin B. Dale
BY

Dec. 31, 1957    C. B. DALE    2,818,263
PHONOGRAPH
Filed Feb. 27, 1951    5 Sheets-Sheet 4

INVENTOR.
Colin B. Dale
BY
Attys.

Dec. 31, 1957 C. B. DALE 2,818,263
PHONOGRAPH
Filed Feb. 27, 1951 5 Sheets-Sheet 5
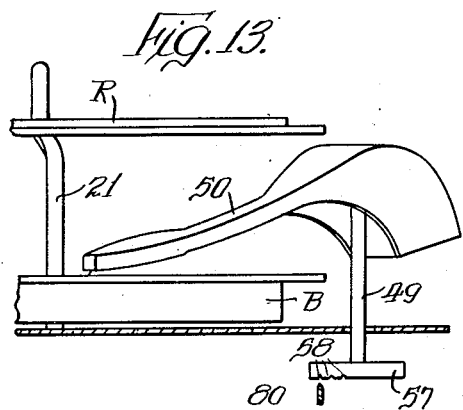
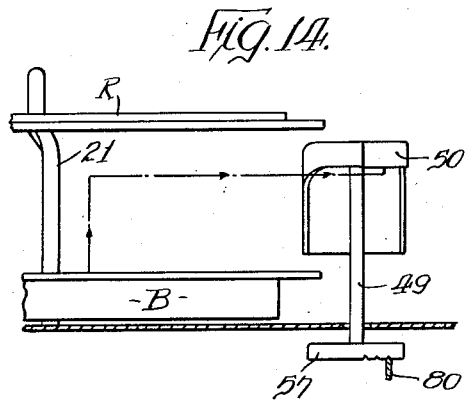
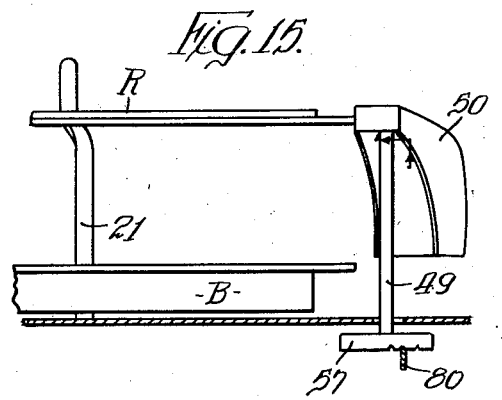
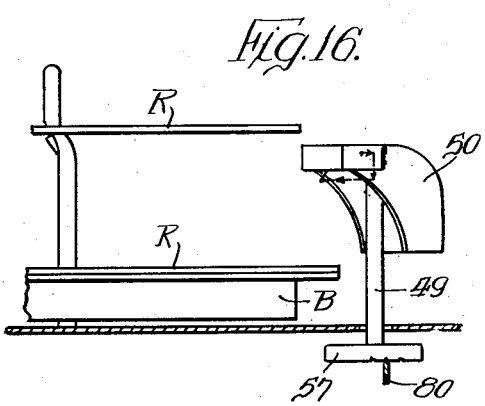
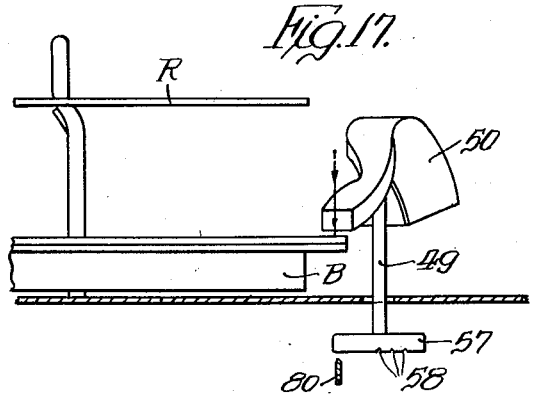
INVENTOR.
Colin B. Dale
BY
Attys:

United States Patent Office 2,818,263
Patented Dec. 31, 1957

2,818,263

PHONOGRAPH

Colin B. Dale, Oak Park, Ill., assignor to Webcor, Inc., a corporation of Illinois Application February 27, 1951, Serial No. 213,009

7 Claims. (Cl. 274—10)

This invention relates to phonographs with which is combined a record-changing mechanism.

Presently phonograph records are being made in different diameters. Two of the most common of these diameters are 10 and 12 inches. To provide for the automatic successive play of records of one or the other of such different diameters involves the problem of swinging the tone arm to starting positions at the correct radial distances so that the needle will engage the record playing groove at a point close to the perimeter thereof.

The main objects of this invention are to provide an improved tone arm actuating mechanism for automatically positioning the needle at the correct point on records of differing diameters; to provide in a tone arm actuating mechanism of this kind means whereby an inward swinging movement of the tone arm toward record playing position is momentarily arrested at the periphery of the reserve record next to be released, and then continues its movement to set the needle in playing position on the record following its release; to provide improved means for effecting an inactive off position of the tone arm following release of the last reserve record; to provide an improved combination of means for automatically and manually controlling the mechanism for effecting the successive release of the records held in reserve on the record supporting means; and to provide an improved combination of means for automatically and manually controlling the mechanism for effecting the successive release of the records held in reserve on the record supporting means; and to provide improved tone arm control and record release mechanisms of this kind which are so simple in construction as to make the manufacture thereof economical and the use thereof so positive and dependable in operation as to secure efficient functioning and reduce repairs and replacements to a minimum.

In the accompanying drawings:

Figure 1 is a plan view of a phonograph having a record changing mechanism in accordance with this invention, portions of the records being broken away to more clearly indicate their superimposed arrangement on the supporting means above the turntable and the tone arm being shown in the beginning-of-play position;

Fig. 2 is a similar view, taken below the plane of the record supporting means, the turntable being broken away to more clearly indicate the speed changing mechanism; the tone arm also partly broken away, is shown in what will be referred to hereinafter as its "starting position," i. e. the position generally occupied when the machine is idle, and to which it is swung when records are placed on or removed from the record-supporting spindle;

Fig. 3 is an enlarged fragmentary view in vertical section, taken on line 3—3 of Fig. 1;

Fig. 4 is a similar view in a horizontal plane, taken on line 4—4 of Fig. 3;

Figure 7:
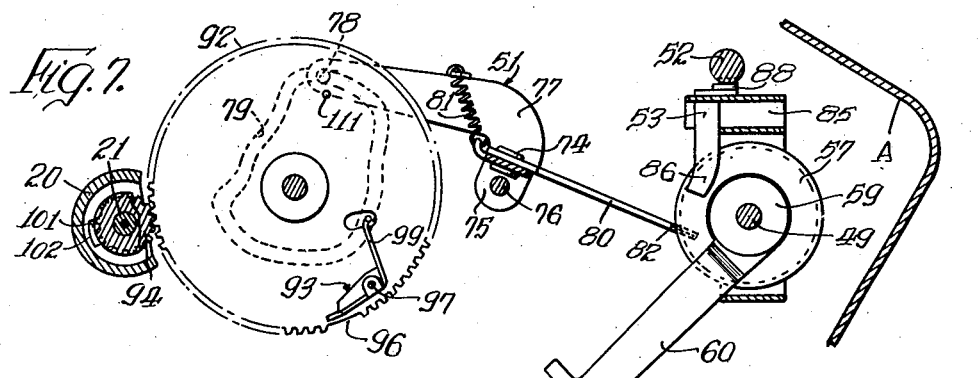
Figure 8:
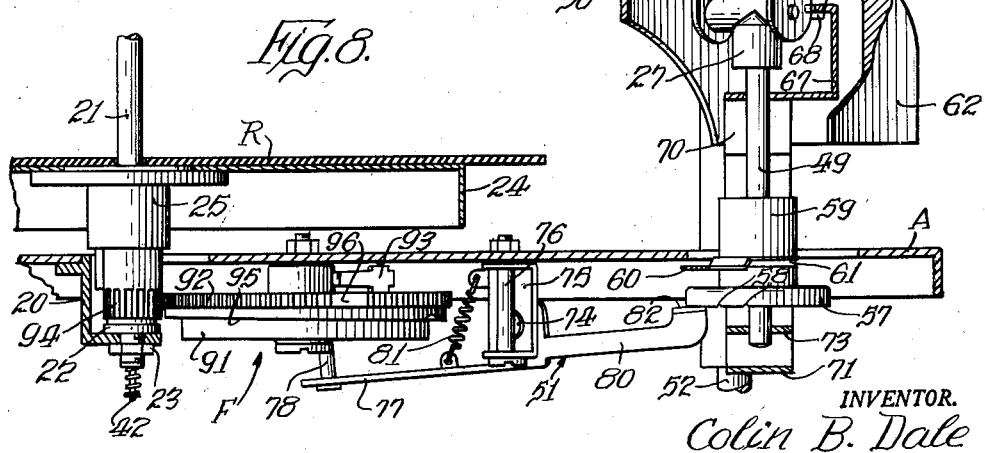
Figure 9:
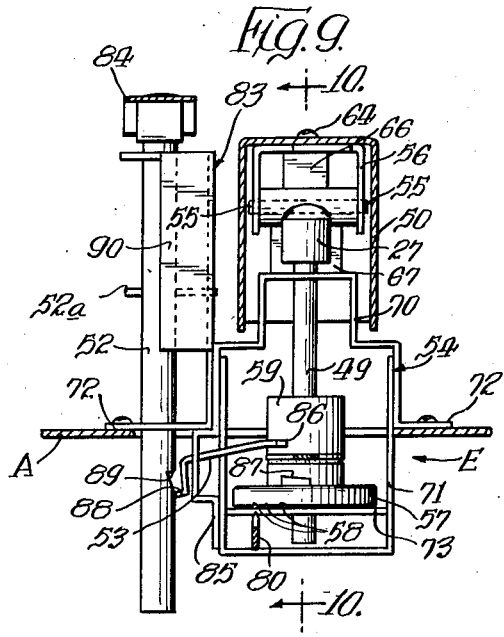
Figure 10:
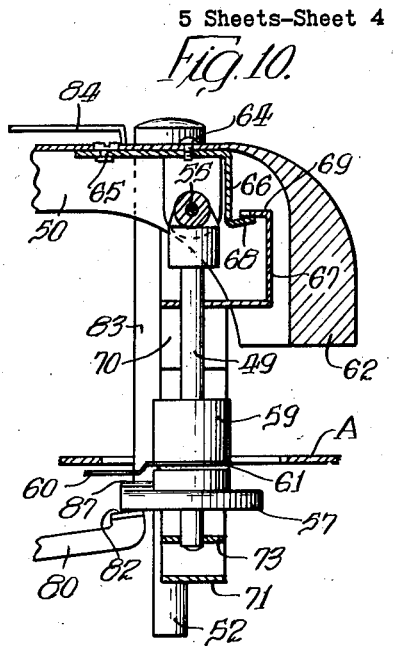
Figure 11:
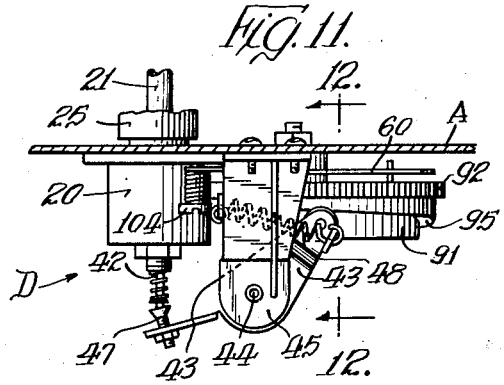
Figure 12:
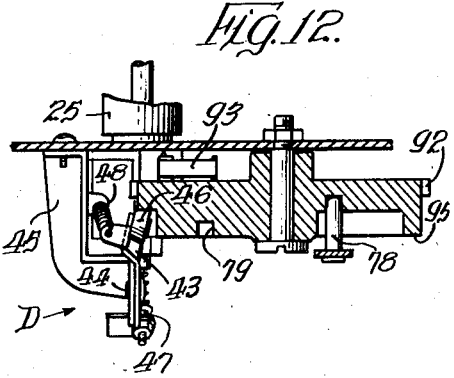

Fig. 7 which is a view similar to Fig. 4 shows the gearing and cam means in shifted positions for producing swinging movement of the tone arm;

Fig. 8 is a view similar to Fig. 3, but indicating the altered position of the parts as they appear in Fig. 7;

Fig. 9 is a fragmentary detail in vertical section of the tone arm mounting and the associated discontinuance-of-play means, taken on line 9—9 of Fig. 3;

Fig. 10 is a similar view, taken on line 10—10 of Fig. 9;

Fig. 11 is a fragmentary detail in section of the record release mechanism, taken on line 11—11 of Fig. 4;

Fig. 12 is a similar view, taken on line 12—12 of Fig. 11; and

Figs. 13 to 17 illustrate somewhat diagrammatically successive positions of the tone arm as it is retracted from its play-completed position back to starting position and again reset at the beginning of the playing groove.

The distinguishing feature of this invention is a tone arm actuating lever driven by a cam recurringly brought into operation with a constantly rotating turntable by a trigger tripped by either of two arms, one of which is moved into tripping position by the tone arm as the needle traverses the fast pitch groove of the record near its center and the other of which is manually moved by a reject button, the lever being caused to swing and rock the tone arm to contact the periphery of each next reserve record and thereby gauge the subsequent positioning of the needle at the beginning of the sound groove. Associated with the tone arm is a record supporting arm positioned to release a detent after release of the last record, which detent checks the subsequent swinging of the tone arm so as to hold it in an inactive or off position following conclusion of playing of a record.

A phonograph having a record-changing mechanism embodying this invention comprises a supporting base A, a turntable B, a plural speed turntable drive C, a record supporting and release mechanism D, a tone arm positioning and discontinuance-of-play mechanism E, and a trigger controlled cam means F for operating the record release and tone arm positioning mechanisms.

The supporting base A, as herein shown, is of rectangular form, being a flanged metal plate whereon are mounted the various mechanisms which will be discussed hereinafter in describing these particular features of the invention. Somewhat offset from the center of the base is a hollow bearing 20 (see Figs. 3, 4 and 8) which provides support for a spindle 21 forming a part of the record support and release mechanism D. Adjacent its lower end the spindle mounts a collar 22 which coacts with a nut 23 to rigidly secure the spindle 21 to the bearing 20. The turntable B is a disc formed with a depending marginal flange 24 and mounting the hub 25 whereby the turntable B is journaled for rotation coaxially of the spindle 21.

The plural speed turntable drive C is of any suitable construction to effect a change in speed of the turntable B to accord with the speed requirements of any of the different records being currently produced. The mechanism herein illustrated for this purpose comprises a friction wheel 28, a three-diameter drive pulley 29, a compound cam 30, and a cam shifting means 31. As shown, the friction wheel 28 has a tread of rubber or the like arranged to frictionally engage both the inner face of the turntable flange 24 and the intermediate idler pulley 29. The friction wheel is journaled on an arm 32 pivotally connected to a rocker 33 which is swingably and slidably mounted on a post 34 to position the nose end 35 of the rocker in engagement with the compound cam 30. The idler pulley 29 is formed with three steps of different diameters, one above the other, and positioned so as to frictionally engage and be driven by a shaft 36 forming part of a motor 26.

Figure 2:
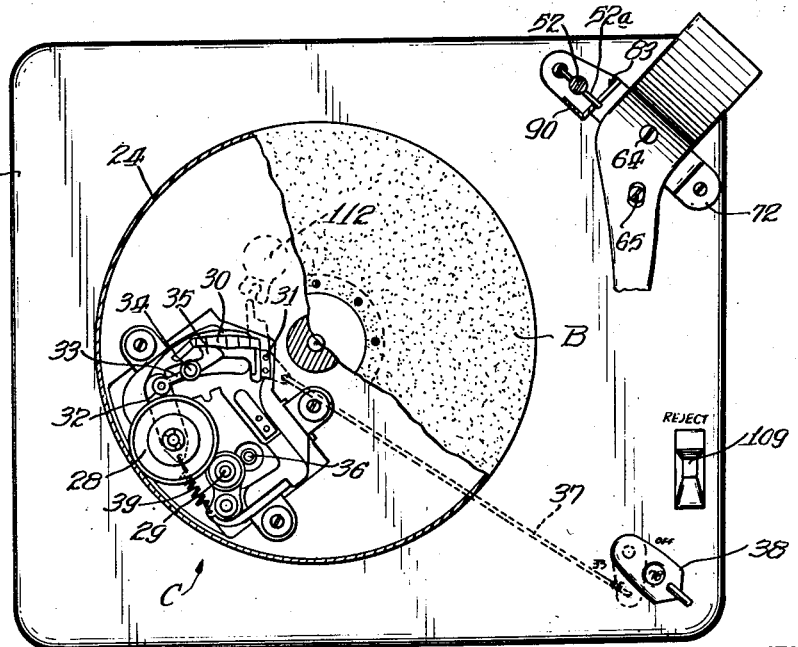

The compound cam 30 is formed with a series of steps and dwells (not detailed herein) which, when the cam 30 is actuated, causes the rocker 33 to shift the friction wheel 28 axially and laterally to selectively place it in driving relationship with one of the pulley steps of the idler 29 and the turntable B as urged by a spring 39. The cam plate 31 which mounts the cam 30 is hinged on the base A and connected by a link 37 to a manually operated lever 38 pivoted on the base so as to move from an "off" position to any one of three different positions required for operation of the turntable at the requisite speed. The position of the lever 38 for the different speeds is indicated in Fig. 2 by the numerals "33," "45" and "78," respectively.

The record support and release mechanism D, itself, forms no part of this invention. It may comprise any suitable means operable by the cam hereinafter described for releasing records R one at a time for gravity descent on to the turntable B. As herein shown, the support and release mechanism comprises the spindle 21 mounting a record shifting pawl 41 near its upper end which is actuated by a push rod 42 that is axially moved by a rocker arm 43 (see Fig. 11). As will be noted from Fig. 3, the upper end of the spindle 21 is offset to provide a shoulder 40 upon which the reserve records R are rested. A spring (not shown) normally urges the pawl 41 into the inactive position shown in Fig. 3.

The rocker arm 43 is pivoted at 44 to a bracket 45 secured to the underside of the base A. One end of the rocker arm 43 mounts a cam roller 46 for engagement with the trigger controlled cam means F presently to be described. The other end of the rocker arm 43 mounts an adjustable screw and lock nut 47 so positioned that its head will engage the lower end of the push rod 42 for the record release mechanism D. A spring 48 normally urges the rocker arm 43 into engagement with the cam means F thus restraining the other end of the arm from exerting upward pressure on the push rod 42.

The tone arm positioning and dicontinuance-of-play mechanism E comprises a tone arm post 49 hingedly mounting a tone arm 50, a rocking lever 51 actuated by the cam means F presently to be described, and an overarm supporting member 52 which controls the functioning of a detent 53 for restraining the tone arm from executing a return movement to needle-placing position after the last record has been played.

The tone arm post 49 is rotatably and axially shiftably mounted on a frame 54 secured to the supporting base A. Mounted fast on the post 49 is a T-shaped head 27 formed with oppositely extending trunnions 55 whereon the tone arm 50 secured to a bracket 56 is hinged for swinging in a vertical plane. A cup-shaped disc 57 fixed on the lower end of the post 49 is engaged by the lever 51 to effect the vertical and horizontal shifting movements of the tone arm 50. The downwardly facing periphery of the disc 57 is provided with a series of notches 58 circumferentially spaced so as to effect correct swinging of the tone arm 50 for records of different diameter, as will be more fully explained hereinafter. A weight 59, freely slidable on the post 49, normally urges the post embracing end of a trigger feather arm 60 into contact with a friction pad 61 resting on the hub of the disc 57.

Figure 1:
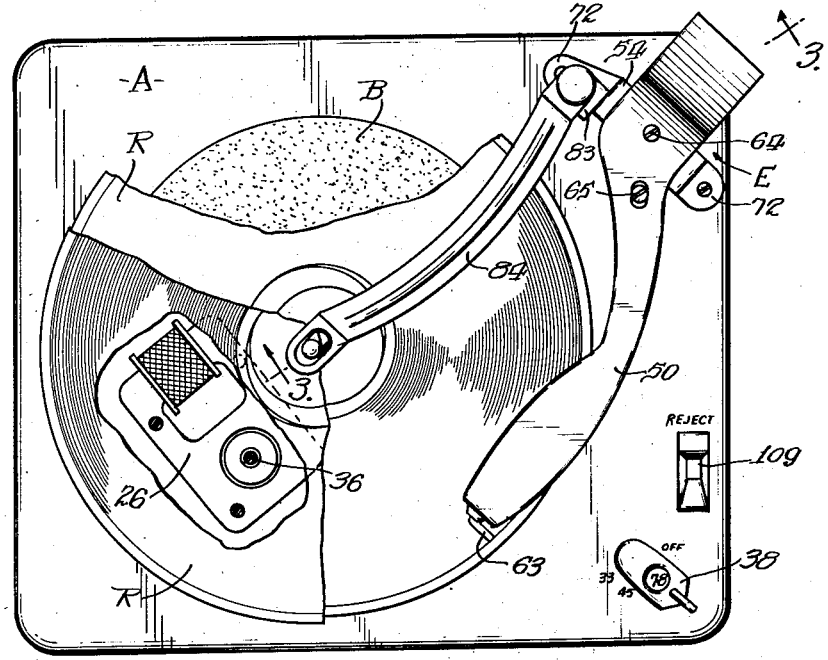

The tone arm 50 may be of conventional construction in the respects of its being channel-shaped with a counter-balancing weight 62 at its rear end. Within its forward end the tone arm carries a transducer having a needle mounting whereon is formed a finger 63 (see Fig. 1) for aiding in securing a desired needle in place. The tone arm 50 is secured to the bracket 56 by a screw 64, and the bracket is provided with an adjusting eccentric 65. The bracket 56 and the frame 54 have opposed integral offset extensions 66 and 67, respectively, formed with shoulder ledges 68 and 69 which coact to determine the tilt of the tone arm 50, depending upon the vertical disposition of the tone arm post 49 (see Figs. 3 and 10).

The frame 54 comprises two U-shaped pieces 70 and 71 the ends of the respective parallel parts of which are secured together so that the two pieces are arranged in opposed relationship (see Fig. 9). The U-shaped piece 70 has its transverse part offset inwardly and provides the upper bearing for the tone arm 50. The ends of the parallel parts of the frame piece 70 are turned outwardly to provide ears 72 whereby the frame 54 is supported on the base A. The other frame piece 71 has a cross bar 73 secured in spaced parallel relationship with the transverse end. The bar 73 serves as a bearing for the lower end of the tone arm post 49 and the transverse end of the piece 71 serves as an abutment for the post 49 to limit its downward axial movement.

The rocking lever 51 for actuating the tone arm post 49 is pivoted at 74 to a bracket 75 swiveled on a pin 76 that is secured to the supporting base A (see Figs. 3 and 4). One of the oppositely extending arms 77 of the lever carries a cam track follower 78 for engagement with the cam track 79 of the trigger controlled cam means F presently to be described. The other arm 80 is positioned to engage the disc 57 on the tone arm post 49. A spring 81 urges the lever 51 rotatively so that the follower 78 is normally engaged with the cam track 79, thereby retracting the arm 80 from the cup-shaped disc 57, as will be explained in connection with the operation of this mechanism.

The overarm supporting member 52 which controls the discontinuance-of-play after the last record has been played is in the form of a post slidably and rotatably supported on a bracket 83 secured to the U-shaped upper frame piece 70 as most clearly shown in Fig. 9. This post 52 mounts an overarm 84 which extends out over the uppermost record R, the free end of the overarm being apertured to fit over the upper end of the spindle 21. The post 52 coacts with the detent 53 which is hinged on a plate 85 (see Fig. 9) attached to the frame piece 71, so that its acting end 86 may be moved into and out of position to engage a shoulder 87 on the cup-shaped disc 57 for restraining rotation of the tone arm post 49 in a clockwise direction after playing of the last record. The hinge for the detent 53 is so positioned that the detent is weighted to urge its acting end 86 into the path of the shoulder 87. However, the opposite end 88 of the detent 53 is formed to engage the periphery of the post 52 and thereby be held to retract the acting end 86 from the path of the shoulder 87. A notch or recess 98 formed in the post 52 is so located that when the last reserve record is released from the spindle 21 the overarm 84 will permit the post 52 to drop down to a point where the notch 89 will register with the end 88 of the detent 53 and free it to permit its acting end 86 to move down into the path of the shoulder 87.

The upper portion of the bracket 83 is formed with an angularly disposed flange 90 (see Fig. 2). A pin 52a in the post 52 contacts the right-angularly disposed edges of the bracket 83 and the flange 90 so as to limit the rotative movement of this post on the bracket.

The trigger controlled cam means F for operating the record release and tone arm positioning mechanism (see Fig. 3) comprises a combination cam 91 and gear 92 mounting a trigger 93, a driving pinion 94, the feather arm 60, and an arm 107. The cam 91 is in the form of a disc having cam tracks 79 and 95 formed thereon.

The cam track 79 is of irregular form radially (see Fig. 4) and of varying axial depths (see Fig. 12). These radial and axial contours are so correlated as to cause vertical and horizontal swinging movements of the rocking lever 51 on the pivot pins 74 and 76 thereby to produce the required vertical and rotative movements of the tone arm post 49 to horizontally swing and vertically move the tone arm 50 from the position at which it finishes the playing of a record outwardly, upwardly and then inwardly against the periphery of the reserve record next to be released; and thereafter slightly outwardly again, then downwardly and inwardly to place the needle at the beginning of the sound groove. These successive movements proceed through paths which are illustrated by the arrows in Figs. 13 to 17.

The cam track 95 is of annular form, near the periphery of the cam 91, and is formed with a single offset or axial elevation such as to cause the rocker arm 43 to axially shift the push rod 42 whereby to initiate the operating cycle which results in releasing a single reserve record from the stack on the spindle shoulder 40. The gear 92 is here shown to be integral with the cam 91 and is journaled in spaced relationship with the supporting base A (see Fig. 3) and in mesh with the pinion 94 that is carried at the lower end of the turntable hub 25. The omission at 96 of teeth on the gear 92 (see Fig. 7) results in an inoperative relationship with the pinion 94 when the gear is rotatively advanced to the one point of non-registration where the pinion 94 is free to continue its rotation until the gear is shifted by the trigger 93 to reengage the teeth on the gear 92 with the pinion 94.

Figure 5:
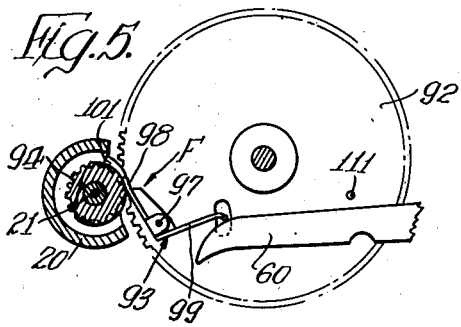
Fig. 5 is a fragmentary detail showing the trigger controlled gearing for the cam means, the trigger being positioned as it is about to effect meshing of the gear with the pinion.
Figure 6:
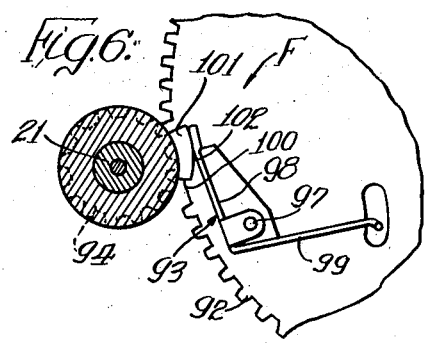
Fig. 6 is a further enlarged, fragmentary view showing the form of the shouldered lug on the pinion which has the dual function of normally retracting the trigger and coacting therewith to effect a meshing of the gear with the pinion.

The trigger 93 (see Figs. 5, 6, and 7) is of bell crank form. It is pivoted at 97 on the upper face of the gear 92 so that its one arm 98 extends along and adjacent to the tooth gap 96 and its other arm 99 extends inwardly from the periphery of the gear 92. The trigger 93 is thus movable so as to position its one end 98 into or out of the path of a shoulder 100 (see Fig. 6) formed by a lug 101 on the periphery of the hub 25 above the teeth of the pinion 94. As will be noted in Fig. 6, the outer face 102 of the lug 101 is arcuate and eccentric to the periphery of the pinion 94 so that with each of its revolutions the arcuate face 102 cams the end 98 of the trigger 93 out of the path of the shoulder 100, thereby permitting a continued rotation of the pinion 94 until the trigger is again actuated by the arms 60 or 107. The other end 99 of the trigger 93 is positioned in the path of the outer end of the feather arm 60 which is swung inwardly by the inward movement of the tone arm 50 during the playing of a record. When this feather arm contacts the end 99 of the trigger 93 (see Fig. 5) it shifts the trigger end 98 into the path of the shoulder 100 and thus effects a shifting of the gear 92 sufficient to bring it into meshing relationship with the pinion 94.

A tripper finger 103 coiled for pivoting upon a post 104 is provided with one end 105 that abuts the arm 99 of the trigger 93 and with an opposite end 106 which extends out beyond the gear 92 (see Fig. 4). This tripper finger 103 is mounted for free movement on the post 102, and its end 106 is located in the path of the outer end of an arm 107 pivoted at 108 to connect at its other end with a manually operable reject button 109 (see Figs. 1 and 2). A spring 110 normally urges the arm 107 out of the path of the tripper end 106. A pin 111 on the upper face of the gear 92 (see Figs. 3 and 4) serves to cam the inner end of the feather arm 60 back out of the path of the end 99 of the trigger 93 after it has once actuated the trigger to engage the shoulder 100.

The operation of the present record-changing mechanism is as follows:

A plurality of records R is supported on the spindle shoulder 40 to be released, one at a time, for gravity descent to playing position on the turntable. These records may be of differing diameters, provided that the smaller ones be stacked above the others. To start operation the lever 38 is shifted from "off" position to a position corresponding with the speed required for play of the record, i. e., 33, 45, or 78 R. P. M. (see Fig. 2). Turning of the lever 38 from the "off" position transmits motion through the link 37 to operate a motor switch 112 concurrently with shifting of the friction wheel 28 to the requisite position for driving the turntable B. In order to drop the first record on the turntable, the reject button 109 should be operated. The arm 107 will then be moved to rock the tripper finger 103, thereby shifting the trigger 93 to move its arm 98 into the path of the shoulder 100 on the hub 25. When this shoulder engages the trigger arm 98 the gear 92 will be given sufficient rotation to bring the teeth thereon into meshing relation with the pinion 94; thereupon rotation of the gear 92 with its affixed cam 91 will continue under the drive of the pinion 94.

Rotation of the cam 91 produces a rocking of the lever 51 until the knife edge 82 comes into contact with one of the notches 58 (see Fig. 8) furthest to the right. This rocking movement proceeds horizontally during the initial stage. The lever 51 will then be actuated by the cam track 79 to swing both horizontally and vertically so that the tone arm 50 will be moved inwardly while in an elevated position to bring the outer inner edge at the free end of the arm into contact with the lowermost record R on the spindle 21, as indicated in Fig. 15. Following this contact of the tone arm 50 with the reserve record that is next to be released, the cam track 79 will cause the tone arm 50 to back away slightly from the record. During this retractive movement of the tone arm 50 the high point on the cam track 95 produces an actuation of the rocker arm 43 so as to lift the push rod and initiate release of the lowermost reserve record from the spindle for gravity descent on to the turntable B. Subsequently the rocking lever 51 moves the tone arm 50 downwardly, inwardly, and then downwardly (see Figs. 16 and 17) to place the needle in contact with an outermost playing groove of the record awaiting play.

As the playing of a record approaches completion, the needle traversing the fast pitch groove near the center of the record swings the feather arm 60 inwardly to trip the trigger 93 and move its arm 98 into the path of the shoulder 100 on the turntable hub 25. As previously explained, this results in a slight rotary movement of the gear 92 so as to bring it into mesh with the pinion 94. The rotation of the gear will thereupon continue for a full revolution until the omitted-teeth space 96 again comes into registration with the pinion 94. During this rotation of the cam 91, the cam track 79 causes a coordinated horizontal and vertical swinging of the rocking lever 51. This results first in an elevation of the tone arm post 49 thereby to cause the outer end of the tone arm to be moved vertically away from the record and then swung counter-clockwise to its farthest out or starting position, as indicated in Fig. 14. Continued movement of the lever 51 transmits a reverse rotative movement to the disc 57 whereupon the tone arm post 49 causes the tone arm 50 to swing inwardly, and with practically no interruption; in so doing the tone arm comes into gauging contact with the edge of the next-to-be released record (see Fig. 15) which very shortly thereafter is deposited on the turntable (see Fig. 17).

It should be noted that the dual function of the notches 58 is to insure the full counter-clockwise swing of the tone arm 50 to its farthest out or starting position, as shown in Figs. 2 and 14, from whatever position—between starting and record finishing—it may be in when the cam 91 initiates the outward swinging of the tone arm, and also to insure a firm initial gauging contact of the tone arm 50 with the record next to be released during the first part of the tone arm's inward swinging movement.

If, in this counter-clockwise swing of the tone arm to the farthest out or starting position, the knife edge 82 of the lever arm 77 engages the center notch 58, or the one nearest the left (see Fig. 8) when the tone arm 50 reaches its starting position, the knife edge will slip out of that notch and continue an idling movement along the under-face of the cup-shaped disc 57. As the knife edge begins its return movement to reset the tone arm 50 in playing position, it seats in the first notch 58 to the right. If the record next to be released is a 12" record, the knife edge will slip out of this first-to-the-right notch and move along the underside of the cup-shaped disc until the cam track 79 reaches the point where the rocking lever 51 has slightly retracted the tone arm preparatory to positioning the needle on the record, as hereinbefore explained.

I claim:

1. In a phonograph having a supporting base and a motor driven record supporting turntable journalled for rotation on the base, the combination comprising means for supporting records above the turntable with the lowermost disposed in a predetermined plane, mechanism for releasing the lowermost record from the supporting means to playing position on the turntable, tone arm means rotatable and axially shiftably mounted on the base at one side of the turntable, cam means driven by the motor, a lever mounted on said base driven by said cam means to move a portion of said lever through a predetermined path, said tone arm means including a plurality of indexing elements spaced from each other in said path of movement predetermined distances proportionally to the differences between the sizes of records received on said supporting means, said lever portion releasably engaging an indexing element to swing the tone arm sequentially from the finish-of-play position radially outwardly and axially upwardly into said plane then radially inwardly in said plane until it engages the periphery of the lowermost record and is thereby arrested against further inward movement of said member by said lever whereupon said lever portion shifts to another indexing element during continuing movement of the lever by the cam means in the same direction, and with said lever portion engaging in said other indexing element to swing the tone arm successively radially outwardly, axially downwardly and radially inwardly to the beginning of play position on the lowermost record contacted following the release thereof onto the turntable, and mechanism actuated by the cam means for actuating the record release mechanism after the tone arm has moved from engaging contact with said record in said plane.

2. In a phonograph having a supporting base and a motor driven record supporting turntable journalled for rotation on the base, the combination comprising means for supporting records above the turntable with the lowermost disposed in a predetermined plane, mechanism for releasing the lowermost record from the supporting means to playing position on the turntable, a tone arm supporting frame arranged on the base, a tone arm post mounted on the frame for axial and rotative movement at one side of the turntable, cam means driven by the motor, a tone arm bracket hinged on the upper end of the post, a lever mounted on said base driven by said cam means to move a portion of said lever vertically and horizontally through a predetermined path, said tone arm post including a plurality of indexing elements spaced from each other in a horizontal portion of said path of movement predetermined distances proportionally to the differences between the sizes of records received on said supporting means, said lever portion releasably engaging an indexing element to swing the tone arm sequentially from the finish-of-play position radially outwardly and axially upwardly into said plane then radially inwardly in said plane until it engages the periphery of the lowermost record and is thereby arrested against further inward movement of said member by said lever whereupon said lever portion shifts to another indexing element during continuing movement of the lever by the cam means in the same direction, and with said lever portion engaging in said other indexing element to swing the tone arm successively radially, outwardly, axially downwardly and radially inwardly to the beginning of play position on the lowermost record contacted following the release thereof onto the turntable, mechanism actuated by the cam means for actuating the record release mechanism after the tone arm has moved from engaging contact with said record in said plane, and coacting shoulders on the frame and the tone arm post for controlling the vertical swinging of the tone arm by the vertical movement of the post for placing the needle in proper engagement with the records.

3. In a phonograph having a supporting base and a motor driven record supporting turntable journalled for rotation on the base, the combination comprising means for supporting records above the turntable with the lowermost disposed in a predetermined plane, mechanism for releasing the lowermost record from the supporting means to playing position on the turntable, a tone arm supporting frame arranged on the base, a tone arm post mounted on the frame for axial and rotative movement, a tone arm bracket hinged on the upper end of the post, a weighted tone arm fixed on the bracket, a disc fixed on the lower end of the tone arm post and having a plurality of indexing elements spaced from each other predetermined distances proportional to the differences between the sizes of records received on said supporting means, a lever mounted on the base for movement about a horizontal and vertical axis, cam means for operating said lever, one arm of said lever moving vertically and horizontally through a predetermined path a horizontal portion of which includes releasable engagement with said indexing elements, said lever arm engaging one of said indexing elements when the tone arm is in its finish-of-play position and raising and turning said post to swing the tone arm outwardly, upwardly and inwardly into engagement with the lowermost record in said plane, said lever urging said tone arm to a predetermined inwardmost playing start position, said lowermost record obstructing further movement of said tone arm by said lever whereupon said lever arm shifts to another indexing element during subsequent movement of the lever by the cam means in the same direction, thereafter said lever lowering said post and rotating it inwardly to return the tone arm to the playing start position of the lowermost record just engaged, and means for actuating the record release mechanism prior to said return of the tone arm to playing position, and means coacting on the frame and the tone arm for timing vertical swinging of the tone arm to the vertical movement of the post for placing the tone arm in proper contact with the record.

4. In a phonograph, the combination of a supporting base, a record supporting turntable journalled for rotation on the base, a motor connected to drive the turntable, a record supporting means arranged above the turntable, mechanism for releasing records one at a time from the record supporting means to playing position on the turntable, a tone arm mounted on the base for vertical and horizontal movement and having a plurality of indexing elements defining a path and spaced from each other predetermined distances proportional to the differences between the sizes of records received on said supporting means, tone arm actuating means including a lever releasably engaging an indexing element, and a driving means actuating said first means for swinging the tone arm from a finish-of-play position radially outwardly and axially upwardly into the plane of the next-to-be released record, then radially inwardly into contact with the periphery of said next-to-be released record, said contact obstructing further movement of said tone arm whereupon said lever shifts to another indexing element with continued movement of the lever by said driving means in the same direction in said path, whereupon said tone arm is then swung outwardly to disengage the next-to-be released record and inwardly to a position corresponding to the playing start position of said record, and mechanism driven by the motor for operating the record release mechanism after the tone arm has disengaged said record.

5. In a phonograph, the combination of a supporting base, a record supporting turntable journalled for rotation on the base, a motor connected to drive the turntable, record supporting means arranged above the turntable, mechanism for releasing records one at a time from the record supporting means to playing position on the turntable, tone arm means mounted on the base for vertical and horizontal movement away from and toward a starting position including a plurality of indexing elements spaced from each other in a predetermined path and at predetermined distances proportional to the differences between the sizes of records received on said supporting means, tone arm actuating means including a member releasably engaging said indexing elements, driving means propelling said member to transcribe a predetermined path of movement in which said member engages an indexing element to move said tone arm radially and vertically from its starting position into the plane of and into gauging contact with the next-to-be released record on said supporting means to obstruct further movement of said tone arm means by said member whereupon said member shifts to another indexing element during continuing movement of said member in the same direction along said predetermined path and thereafter said member through its engagement with said other indexing element swings said tone arm inwardly and lowers it to an initial sound-reproducing position corresponding to the diameter of said record, and mechanism driven by the motor for timing the operation of the record release mechanism and the tone arm actuating means after said tone arm means disengages said record.

6. In a phonograph, the combination of a supporting base, a record supporting turntable journalled for rotation on the base, a motor connected to drive the turntable, means for supporting records above the turntable, mechanism for releasing records one at a time from the record supporting means to playing position on the turntable, a tone arm mounted on the base for vertical and horizontal movement away from and toward a starting position including a plurality of indexing elements spaced from each other in a predetermined path at predetermined distances proportional to the differences between the sizes of records received on said supporting means, tone arm actuating means including a lever mounted on the base for movement about vertical and horizontal axis and having an arm releasably engaging an indexing element, cam means driven by the motor having a nonplanar track engaged by a portion of said lever, said cam means being so constructed and arranged to drive said arm into engagement with said indexing element as it is rotated and move the tone arm outwardly, upwardly and inwardly against the lowermost record on said record supporting means with said arm following said predetermined path, said lowermost record obstructing further inward movement of said tone arm by said arm whereupon said arm shifts to another indexing element under continued movement of said arm by said cam means in the same direction along said predetermined path, mechanism for thereafter releasing said lowermost record onto the turntable, said cam means and lever then moving the tone arm inwardly to playing position at the start of said released record.

7. In an automatic phonograph for the sequential playing of a plurality of records of varying diameters having a base, a turntable journalled for rotation on said base, a motor operable upon actuation to drive said turntable, means for supporting a stack of records above said turntable, mechanism for releasing records one at a time from the record supporting means to playing position on the turntable, a tone arm adapted for vertical and horizontal swinging movement relative to said turntable, means for raising said tone arm from the surface of the record at the termination of sound reproduction of a particular record, swinging said tone arm outwardly to a limit position, swinging said tone arm inwardly to engage the periphery of the lowermost record in said stack, swinging said tone arm outwardly a limited extent, and swinging said tone arm inwardly to a position corresponding to the initial reproducing position of the record engaged, the last said means including a lever having an arm and pivotally mounted for movement horizontally and vertically, a cam actuating said lever to move the arm through a predetermined path, a member carried by said tone arm having a plurality of indexing elements spaced from each other along said path predetermined distances proportional to the differences between the sizes of records received on said supporting means, said arm releasably engaging an indexing element during movement in said path to move said member, said engagement of said tone arm with the lowermost record in said stack obstructing further movement of said member by said arm whereupon said arm shifts to another indexing element during continuing movement of the lever by the cam along said path, the extent of said shifting corresponding to the diameter of the record engaged by the tone arm, and means for operating the record release mechanism in timed relation to the tone arm actuating means.

References Cited in the file of this patent

UNITED STATES PATENTS

| | | |
|---|---|---|
| 1,469,152 | Boumphrey | Sept. 25, 1923 |
| 2,295,092 | Offen | Sept. 8, 1942 |
| 2,330,293 | Knox | Sept. 28, 1943 |
| 2,370,875 | Pressley | Mar. 6, 1945 |
| 2,436,529 | Pressley | Feb. 24, 1948 |
| 2,509,811 | Dale | May 30, 1950 |
| 2,570,040 | Thorens et al. | Oct. 2, 1951 |
| 2,578,378 | Stolberg | Dec. 11, 1951 |
| 2,616,708 | Vivie | Nov. 4, 1952 |
| 2,628,843 | Comstock | Feb. 17, 1953 |

FOREIGN PATENTS

| | | |
|---|---|---|
| 624,721 | Great Britain | June 15, 1949 |
| 110,392 | Sweden | Apr. 18, 1944 |
| 231,928 | Switzerland | July 17, 1944 |